United States Patent Office 3,518,427
Patented June 30, 1970

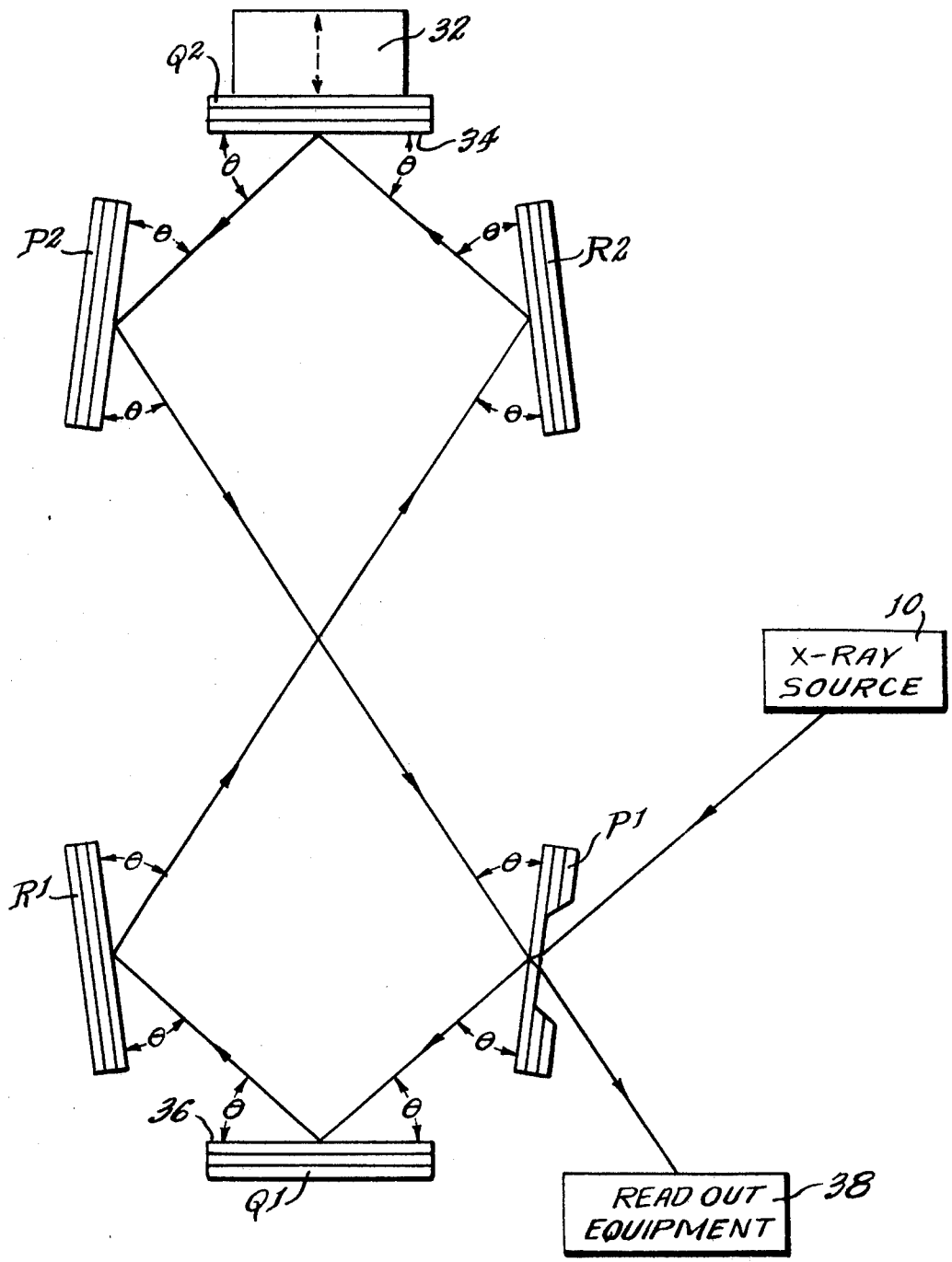

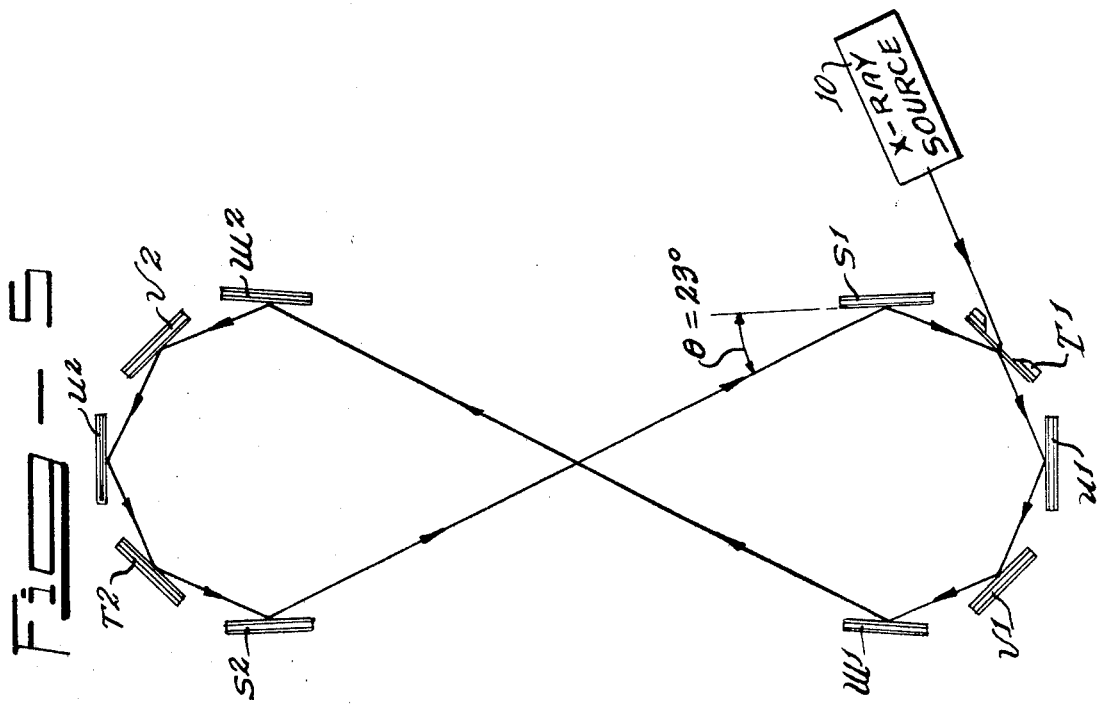
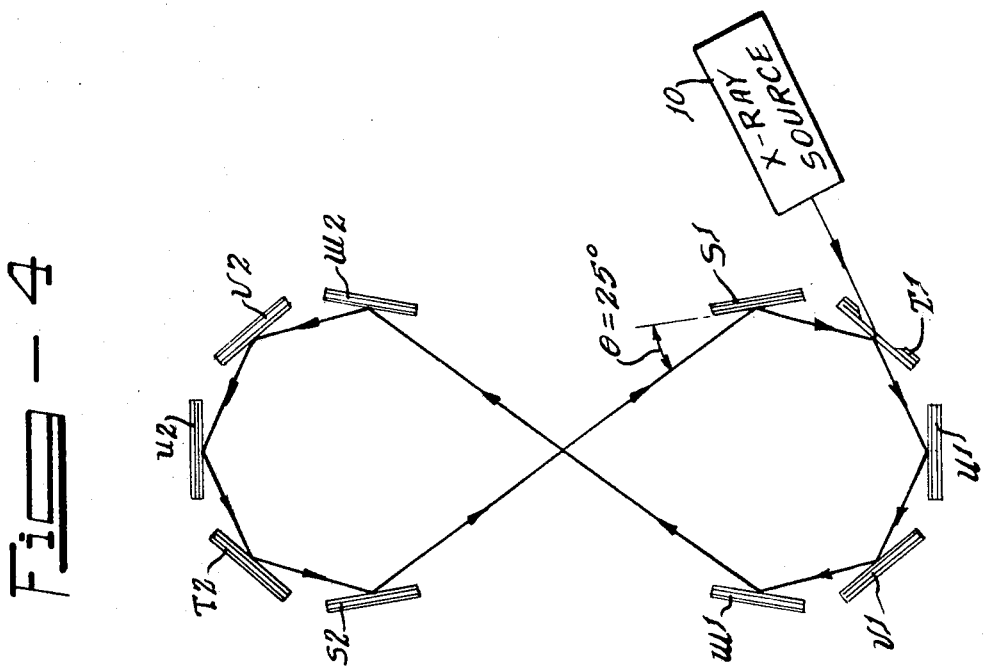

3,518,427
UNIVERSAL PLANAR X-RAY RESONATOR
Rodney M. J. Cotterill, Downers Grove, Ill., assignor to the United States of America as represented by the United States Atomic Energy Commission
Filed June 5, 1968, Ser. No. 734,688
Int. Cl. H05g 1/02
U.S. Cl. 250—53                                 3 Claims

ABSTRACT OF THE DISCLOSURE

A device for selecting and conserving a monochromatic X-ray beam by successive reflections from an even number of Bragg reflectors, pairs of which are parallel. This sets forth a geometrical relationship of reflectors which permits tuning X-rays of various wave lengths for any crystal having corresponding Bragg angles ranging from about 15° to about 60°.

CONTRACTUAL ORIGIN OF THE INVENTION

The invention described herein was made in the course of, or under, a contract with the United States Atomic Energy Commission.

BACKGROUND OF THE INVENTION

A relatively new field is being explored in attempts to design devices which will select a particular wave length of X-ray. Such devices are called X-ray monochromators, or tuners. The present invention goes one step further with a monochromator, or tuner, which is also a resonator. That is, it continues to reflect a specific wave length of X-ray around a closed path until the X-ray energy is dissipated eventually through absorption losses in successive reflections.

Prior art attempts to design X-ray resonators have wrestled with a specific problem which arises when the Bragg angle is not an exact fraction of the geometric angles available in such a resonator. It is highly unlikely that for a given X-ray wave length one would find a suitable plane among available crystals with the exact Bragg angle required by the geometry of the resonators proposed in the prior art. For example, four identical crystal reflectors positioned as sides of a box could resonate an X-ray wave length which would be reflected with a perfect Bragg angle of 45° from each crystal face around a circular type path. However, if the Bragg angle were 46° or 44°, such a resonator would be useless. To solve this dilemma Bond, et al., Applied Physics Letters, vol. 10, No. 8, pp. 216–218 (Apr. 15, 1967) propose to "pucker" the plane of reflection by tilting alternate crystals to accommodate Bragg angles slightly greater than 45°. Such tilting precludes planar reflection and destroys the polarity of the reflected wave front. Moreover, there is no provision for Bragg angles slightly less than 45°. Such shortcomings have been overcome by the present invention.

SUMMARY OF THE INVENTION

This X-ray resonator filters out all but a particular wave length of X-ray by reflecting an X-ray beam successively from one Bragg reflector to another. Using an even number of Bragg reflectors, pairs of which are parallel, a monochromatic beam is preserved by multiple reflections involving at least one cross-over such as would be obtained by a figure-eight closed path. All of the reflectors reflect the X-ray beam in the same plane which preserves the polarity of the wave front. The relative positions of the reflectors are determined by the specific Bragg angle involved. The number of pairs of reflectors is determined by the general magnitude of the Bragg angle.

The configuration of the resonator makes it possible to adjust both the number of pairs of reflectors and the position of the reflectors to accommodate any Bragg angle. It should be noted that this resonator also allows the use of crystals all of which are of identical chemical composition as reflectors thereby assuring the monochromatic quality of the X-ray beam.

It is an object of this invention to provide a planar X-ray monochromator, or tuner.

It is also an object to provide a device for measuring minute dimensional changes.

It is also an object of this invention to provide a device which may be suitable as a component of an X-ray counterpart of the optical laser.

BRIEF DESCRIPTION OF THE DRAWINGS

In the drawings.

FIG. 3 is a schematic plan view of a resonator adapted for use as an interferometer;

FIG. 4 is a schematic plan view of a resonator set up for a Bragg angle of 25°; and FIG. 5 shows the adaptation of the FIG. 4 resonator to accommodate a Bragg angle of 23°.

DETAILED DESCRIPTION OF THE DRAWINGS

Figure 1:
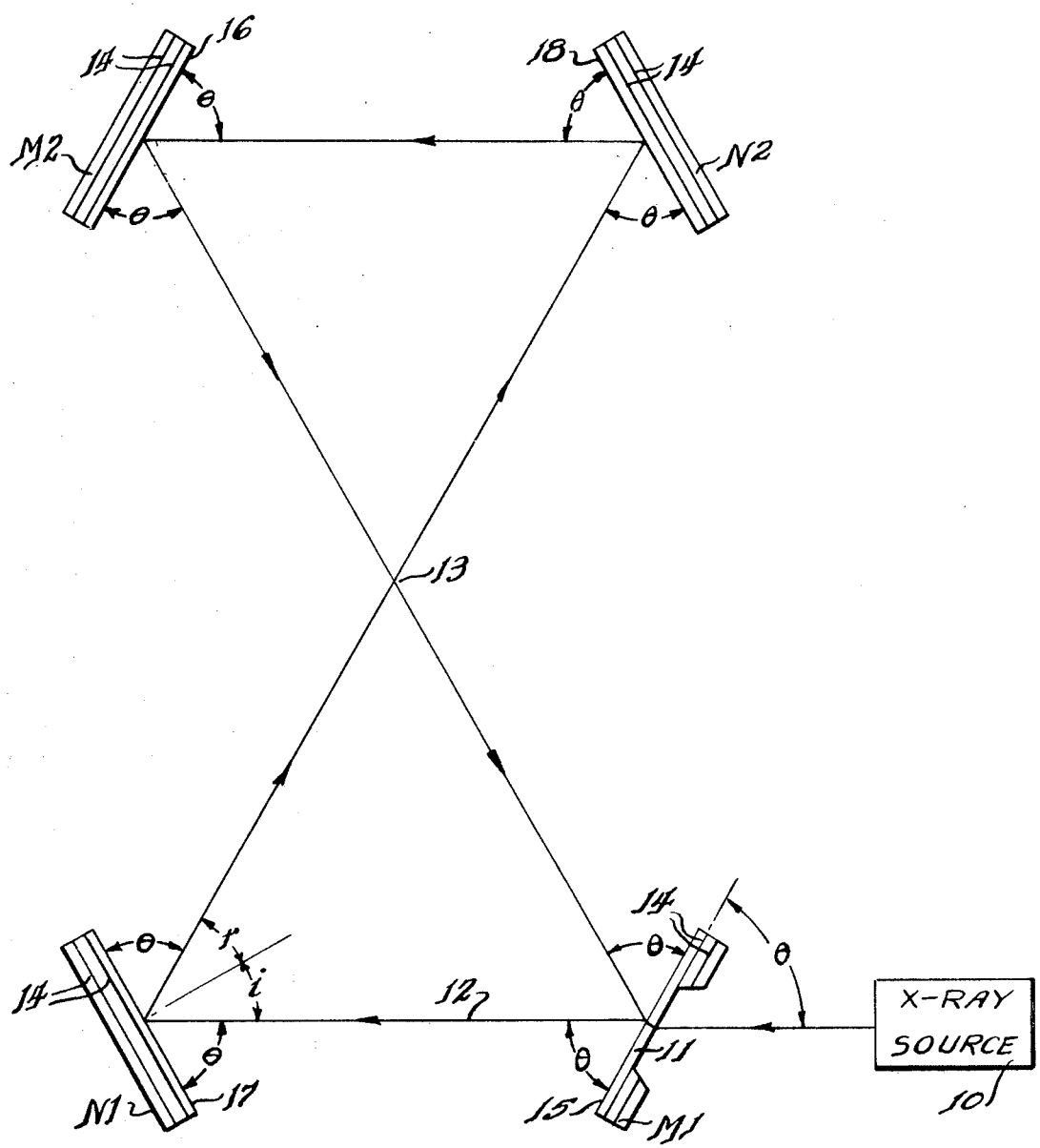
FIG. 1 is a schematic plan view of a resonator having two pairs of reflectors.

Th planar X-ray resonator as shown in FIG. 1 is set up for a 60° Bragg angle, $\theta$, which would be characteristic of the crystals forming Bragg reflectors M1, N1, N2 and M2. It should be noted that a Bragg angle is that angle at which a given crystal surface will reflect a specific wave length of X-ray with minimum absorption in the crystal lattice. Theoretically, the reflectivity at the Bragg angle for a perfect crystal should approach unity (100%). Such a crystal is called a Bragg reflector. Typically, germanium or silicon single crystals are used. These should be of high purity and have nearly perfect crystal structure.

At least one worker has obtained reflectivities greater than 95% for CuK$\alpha$ rays on the (220) planes of germanium. One can see that successive reflections under such conditions would quickly filter out all but a single wave length in an X-ray beam. Such a beam is characterized as monochromatic. A resonator which would reflect a monocromatic X-ray beam efficiently in a closed path would be an essential element of an X-ray counterpart of the optical laser. Since X-rays are electromagnetic radiation with wave structure, one can see also that successive reflections in the same plane would quickly attenuate all but the wave fronts which are normal to the beam path and parallel to the crystal surfaces. This is called polarizing. Just as the angle of reflection, $r$, for visible wave lengths is equal to the angle of incidence, $i$, so also the Bragg angle, $\theta$, is the same for both the incident and reflected X-ray beams. The relationships between the angle of incidence, $i$, the angle of reflection, $r$, and the Bragg angle, $\theta$, are shown at reflector N1 in FIG. 1.

In FIG. 1 an X-ray source 10 is positioned to direct a beam of X-rays at a window 11 in the Bragg reflector M1. Such windows are thin portions of the crystal which one skilled in the art uses to take advantage of the phenomenon of anomalous transmission of X-rays in perfect crystals. This allows approximately 50% of the X-ray beam from the source 10 to pass through the window 11 and emerge at the characteristic Bragg angle $\theta$, inside the resonator as an emerging X-ray beam 12. Successive Bragg reflectors N1, N2, M2 and M1 are adjusted to both receive and reflect the beam 12 at the same Bragg angle, $\theta$. The Bragg reflectors are positioned to maintain the X-ray beam 12 in a single plane of reflection, such that the beam can form a closed path by undergoing successive reflections. Thus the beam is characterized as planar. In addition, successive Bragg reflectors M1, N1, N2 and M2 are positioned so that the X-ray beam 12 forms a figure-eight closed path by its lines of reflection which produce one cross-over point 13. Reflecting planes 14 are shown symbolically in each Bragg reflector.

As shown in FIG. 1, an essential part of the geometry of this planar X-ray resonator is that the Bragg reflectors are paired with the reflecting surfaces of each pair parallel. Reflectors M1 and M2 are paired, and N1 and N2 are paired. The reflecting surfaces 15 and 16 of M1 and M2 are parallel. Likewise, the reflecting surfaces 17 and 18 of N1 and N2 are parallel. Reflectors M1 and N1 may be referred to as a "set" and reflectors M2 and N2 as an "opposing set." The reflecting surfaces 15, 16, 17 and 18, of course, must be normal to the single plane which includes all reflections and must intersect that plane.

Figure 2:
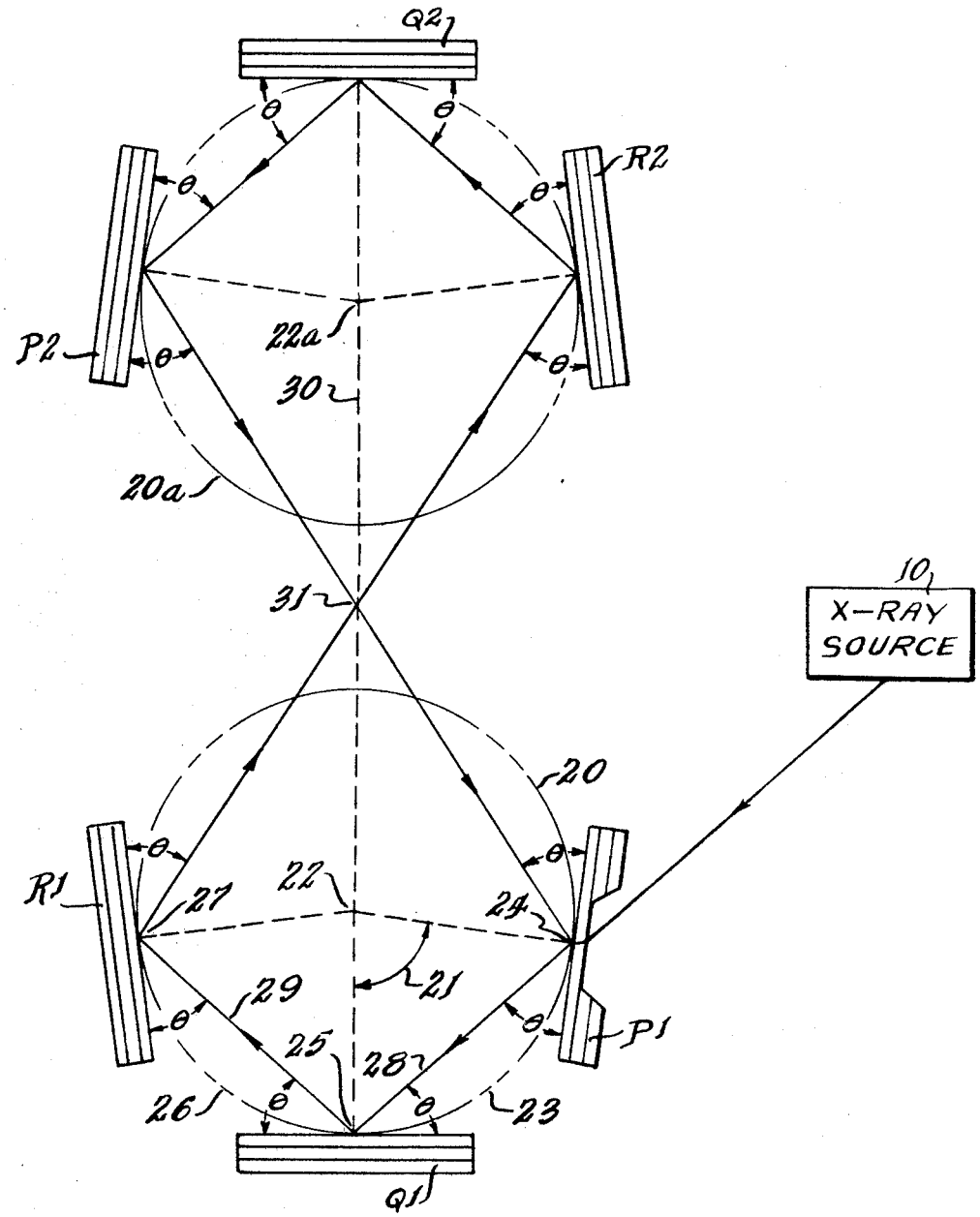
FIG. 2 is a schematic plan view of a resonator having three pairs of reflectors.

Four Bragg reflectors, two pairs of which are parallel, as shown in FIG. 1, are suitable for handling Bragg angles greater than about 45°. When Bragg angles of 45° or smaller are to be used, one only needs to increase the number of pairs of Bragg reflectors to three, P1 and P2, Q1 and Q2, and R1 and R2, as shown in FIG. 2 in which the Bragg angle, $\theta$, is about 40°. To maintain the planar, figure-eight geometry one can see that for Bragg angles of 30° or less one must use four pairs of reflectors and at 22.5° or less five pairs are necessary. Six pairs are necessary for angles of 18° or less, and at 15° or less one would need seven pairs of reflectors. This is a result of the fact that the direction of the X-ray beam path is changed by $2\theta$ for each reflector used. If a figure-eight closed path is to be obtained, it is obvious that $n$ times $2\theta$ must exceed 180°. On the other hand, one can see that if $n$ times $2\theta$ is exactly equal to 360°, only $n$ single reflectors would be needed since this would form a circular type of closed path. The latter is the rare, ideal condition wherein the present figure-eight type of path is unnecessary. However, by using one less reflector than that required for a full 360° reflection, one may use the present figure-eight resonator and have the flexibility of adapting the resonator to slightly different temperature or wave length conditions which cause slight shifts in the value of $\theta$. The number of usable pairs, $n$, of Bragg reflectors is a function of the Bragg angle, $\theta$, such that $n$ must fulfill the requirements of being an integer which is larger than the number obtained by dividing 180° by $2\theta$ and at the same time smaller than that obtained by dividing 360° by $2\theta$. The range of values for $n$ may be expressed mathematically as follows:

$$\frac{90°}{\theta} < n < \frac{180°}{\theta}$$

With smaller Bragg angles one can see from the above relationship that several choices of $n$ are available. For example, at $\theta = 22.5°$ one could not use 4 pairs of reflectors, but could use 5, 6 or 7 pairs. An eighth pair would not be usable since an eighth reflector would complete a perfect circular-type of path.

As further shown in FIG. 2, this resonator is preferably constructed with the reflectors tangent to circles. For example P1, Q1 and R1 are positioned so that each reflecting surface is tangent to a circle 20 drawn in the plane of reflection. One can see from the geometrical relationships that an angle 21 subtended at a center 22 of the circle 20 by an arc 23 included between successive tangent points 24 and 25 of reflectors P1 and Q1 respectively, will be equal to $2\theta$. Likewise an arc 26 between tangent points 25 and 27 of reflector Q1 and R1, respectively, also subtends an angle of $2\theta$. Thus, chords 28 and 29 of arcs 23 and 26, respectively, are identical in length. These chords represent the path of the X-ray beam. Similarly, the opposing set of reflectors P2, Q2 and R2 are tangent to circle 20a (also in the plane of reflection) and are equally spaced apart on the circumference of that circle.

The reflectors of the resonator as shown in FIG. 2 are symmetrically positioned about their respective circles relative to a center-line 30 which extends between centers 22 and 22a of circles 20 and 20a, respectively. The symmetry of the resonator gives a beam cross-over point 31 which falls on the center-line 30 midway between the centers 22 and 22a.

While a symmetrical arrangement of opposed sets of reflectors is ideal, this is not to be construed as excluding minor modifications which would give an asymmetrical arrangement. Many such modifications are possible. For example, in FIG. 1, if reflector N1 were moved to the right a short distance a modified figure-eight path could be established by moving reflector N2 to the right an equal distance.

Since a range of about 15° to 60° will cover essentially all of the usable Bragg angles, this type of resonator takes on a universal aspect. This is especially significant when one recognizes that this type of resonator, in addition to being able to accommodate any Bragg angle, may be equipped with any of a number of suitable crystals as Bragg reflectors. Other than the additional pair of Bragg reflectors, the structure of the resonator as shown in FIG. 2 is comparable to that shown in FIG. 1.

The resonator set forth in FIG. 2 is shown in FIG. 3 with a modification which makes it possible to use the resonator as an X-ray interferometer. This modification consists of a movable mount 32 on which the reflector Q2 is mounted. The mount 32 is movable in a direction normal to the reflecting surface 34 of reflector Q2 while maintaining the surface 34 of reflector Q2 parallel with the reflecting surface 36 of reflector Q1. Where the length of the path traveled by the reflected X-ray beam inside the resonator is an exact multiple of an X-ray wave length, one would expect to obtain constructive interference and if the path length were increased by one half of a wave length one would expect destructive interference. Therefore, if the mount 32 were moved responsive to a minute change in a dimension being measured, the change would be detectable by means of suitable readout equipment 38 positioned to record the number of interference maxima and minima passing a suitable reference point in the field of view just as in optical interferometry. From the geometry of the resonator it will be apparent that any one of the reflectors could be placed on a movable mount, or in fact the entire set of reflectors, P2, Q2 and R2 could be placed on one movable mount.

Optical interferometers are recognized as extremely accurate instruments, being limited in accuracy only by the 5,000–6,000 A. wave length of light generally used. The X-ray interferometer described above will use X-rays having wave lengths on the order of 1 or 2 A., which gives the X-ray interferometer a potential accuracy of about 5,000 times that of an optical interferometer.

In FIG. 4 an X-ray resonator is set up for crystals having a 25° Bragg angle. Such an angle requires five pairs of Bragg reflectors: S1 and S2, T1 and T2, U1 and U2, V1 and V2 and W1 and W2. If one wished to adjust such a resonator to a slightly different value of $\theta$, one would readjust the inclination of each reflector to the X-ray beam 42. If the value of the angle $\theta$ were decreased to 23°, for example, one would adjust the resonator to the configuration shown in FIG. 5. In order to accomplish this, it is necessary to increase the separation of one set of reflectors S1, T1, U1, V1 and W1 from an opposing set S2, T2, U2, V2 and W2.

A temperature change can cause a slight shift in the size of a Bragg angle, that is, increasing or decreasing the angle by a few seconds or minutes of arc. While it is desirable to maintain a constant temperature to prevent such changes, it is not necessary to tune this resonator by maintaining the temperature at an inconveniently low temperature. A great disadvantage of prior art devices is that they may be operated only at a specific temperature which often is difficult to control. One definite advantage of this resonator is that it may be maintained at any convenient temperature, including room temperature, wherein tuning is accomplished by adjusting the geometry of the reflectors to accommodate the particular value of the Bragg angle at that temperature. Corrections for small changes in temperature, hence in $\theta$, may be made simply through minor adjustments of the reflectors.

Any X-rays which are commonly emitted by commercial X-ray machines may be used. For example, copper $K\alpha$ X-rays are suitable. The energy range would be on the order of a few kiloelectron volts with wave lengths on the order of a few angstrom units.

It will be understood that the invention is not to be limited to the details given herein but that it may be modified within the scope of the appended claims.

The embodiments of the invention in which an exclusive property or privilege is claimed are defined as follows:

1. An X-ray resonator comprising: first and second spaced-apart opposing sets of an equal number, $n$, of Bragg reflectors, all reflectors having an identical characteristic Bragg angle, $\theta$, and all having a reflecting surface positioned normal to and intersecting a single plane of reflection, each of said sets having $n$ reflectors positioned successively from a first reflector to an $n$th reflector such that each successive reflecting surface makes an angle of $180°-2\theta$ with the preceding surface, the first reflector of the second set positioned parallel to the $n$th reflector of the first set, both reflectors inclined at an angle of $\theta$ to a line of reflection between them; the $n$th reflector of the second set positioned parallel to the first reflector of the first set, both reflectors inclined at an angle $\theta$ to a line of reflection between them, said lines of reflection crossing, thereby completing a closed, figure-eight path for a reflected X-ray beam, the number, $n$, of reflectors in each set being determined by the value of $\theta$ according to the relationship $$\frac{90°}{\theta} < n < \frac{180°}{\theta}$$

and means for introducing an X-ray beam into said resonator.

2. The X-ray resonator, as set forth in claim 1, wherein the reflecting surfaces of each of said Bragg reflectors in said first set of reflectors are tangent to a first circle drawn in the plane of reflection said reflectors being spaced apart on the circumference of said circle such that chords joining successive tangent points each subtend an angle of $2\theta$ at the center of said circle, the chords coinciding with the X-ray beam path, and the reflecting surfaces of said Bragg reflectors in said second set of reflectors are identically positioned with respect to a second circle drawn in the plane of reflection, said first and second circles being of equal diameter, said reflectors being symmetrically positioned with respect to a center line joining the centers of said circles such that the lines of reflection between said sets of reflectors intersect on said center line midway between the centers of said two circles.

3. An X-ray interferometer comprising an X-ray resonator as set forth in claim 1, wherein at least one of said reflectors is attached to a movable mount, said mount being movable in a direction normal to the reflecting surface of said reflectors; and means for sensing changes in interference pattern caused by movement of said mount.

References Cited

UNITED STATES PATENTS 2,999,931   9/1961   Zingaro _____ 250—51.5

OTHER REFERENCES

"X-Ray Monochromators and Resonators From Single Crystals," by R. D. Deslattes from "Applied Physics Letters," vol. 12, No. 4, Feb. 15, 1968, pages 133 to 135.

WILLIAM F. LINDQUIST, Primary Examiner

U.S. Cl. X.R.

250—51.5